United States Patent [19]
Ochiai

[11] Patent Number: 4,977,942
[45] Date of Patent: Dec. 18, 1990

[54] PNEUMATIC TIRE HAVING DEFINED LUG GROOVE CONFIGURATION

[75] Inventor: Kiyoshi Ochiai, Kobe, Japan

[73] Assignee: Sumitomo Rubber Industries, Ltd., Hyogo, Japan

[21] Appl. No.: 399,968

[22] Filed: Aug. 29, 1989

[30] Foreign Application Priority Data

Aug. 31, 1988 [JP] Japan .................................. 63-219154

[51] Int. Cl.⁵ .............................................. B60C 11/04
[52] U.S. Cl. .................... 152/209.00 B; 152/209.00 R
[58] Field of Search ............ 152/209 R, 209 B, 209 D

[56] References Cited

U.S. PATENT DOCUMENTS

| | | | |
|---|---|---|---|
| 4,122,879 | 10/1978 | Takigawa et al. | 152/209 R |
| 4,177,850 | 12/1979 | Ogawa et al. | 152/209 R |
| 4,217,942 | 8/1980 | Takigawa et al. | 152/209 R |
| 4,840,211 | 6/1989 | Makino | 152/209 R |

*Primary Examiner*—Michael W. Ball
*Assistant Examiner*—Geoffrey L. Knable

*Attorney, Agent, or Firm*—Birch, Stewart, Kolasch & Birch

[57] ABSTRACT

A pneumatic tire improved in resistance to uneven wear, which has a rib-lug tread pattern comprising longitudinal grooves extending circumferentially of the tire, lug grooves extending axially of the tire to form lugs in tread shoulder regions, and sipes formed in the tread shoulder regions, wherein each lug groove is composed of an outer part having side walls with a single inclination of an angle L3 and an inner part having side walls with a double inclination, each side wall of the inner part is composed of an upper wall inclined at an angle L1 and a lower wall inclined at an angle L2, the angle L1 is more than 35 degrees, the angle L3 is smaller than the angle L1 and the angle L2 is smaller than the angle L3, the length B of the outer part is more than 0.2 and less than 0.4 times the total length A of the lug groove, the depth H1 of the upper walls of the inner part is more than 0.15 and less than 0.50 times the full depth H of the inner part, the axial length W1 of each sipe is less than 0.3 times the length A of the lug grooves at the tread face of the tread.

3 Claims, 9 Drawing Sheets

PNEUMATIC TIRE HAVING DEFINED LUG GROOVE CONFIGURATION

The present invention relates to a pneumatic tire improved in registance to uneven wear caused around lug grooves, and more particularly to an improved construction for a lug groove.

In tires for heavy duty vehicles such as trucks, buses and the like, a rib-lug type tread pattern, in which lug grooves extending axially of the tire are formed in tread shoulder regions, has been widely used to provide good wet grip performance and brake performance. However, it has been known that if axially extending lug grooves are formed, the so-called heel and toe wear is apt to be cause around the lug grooves and such uneven wear greatly reduces the tire life. Here, the heel and toe wear is a partial wear as shown in FIG. 11, in which the tread face wears to a greater extent in part upward of the groove wall GW on the toe side Ta of the lug than that on the heel side T.

In order to lessen such uneven wear of tread, shallowing the lug grooves G, widening the lug grooves G, and providing the groove wall GW with an inclination have been employed to reduce the leaning of the groove wall GW into the lug groove and thereby to decrease the amount of slip of the tread face against the road surface.

Such means, however, deteriorate the tire performances such as braking performance, traction performance, wet grip performance, on-the-snow performance and like.

In particular, by decreasing the groove depth and increasing the inclination of the groove wall GW, the stiffness of the tread rubber around the lug grooves is increased, and uneven wear called shoulder wear in which the tread wears more rapidly in the shoulder regions than the tread crown region is furthered.

It is therefore, an object of the present invention to provide a pneumatic tire in which uneven wear such as heel and toe wear and shoulder wear is prevented without deteriorating the tire performance.

According to one aspect of the present invention, a pneumatic tire having a rib-lug type tread pattern comprising longitudinal grooves extending circumferentially of the tire to form a rib in a crown of the tread, lug grooves extending axially of the tire to form lugs in each tread shoulder region, and sipes formed in the tread shoulder regions at least one between the lug grooves, each lug groove composed of an outer part having side walls with a single inclination of angle L3 and an inner part having side walls with a double inclination, each side wall of the inner part composed of an upper wall inclined at an angle L1 and a lower wall inclined at an angle L2, the angle L1 being more than 35 degrees, the angle L3 being smaller than the angle L1, and the angle L2 being smaller than the angle L3, the length B of the outer part being more than 0.2 and less than 0.4 times the total length A of the lug groove, the depth H1 of the upper walls of the inner part being more than 0.15 and less than 0.50 times the full depth H of the inner part, the axial length W1 of each sipe on the tread surface being less than 0.3 times the length A of the lug grooves.

Accordingly, the inner part of the lug groove is provided with a narrow groove width part between the lower walls and a wide groove width part between the upper walls inclined at angle L1 over 35 degrees to increase the stiffness, and the movement of the wall into the lug groove is controlled to prevent uneven wear, with maintaining the groove cross section in an enough area to prevent reduction in tire performance such as breaking performance and wet grip performance.

Further, the lug groove has, in the tread edge region, the outer part which is smaller rigidity than the wide groove width part because the side walls thereof are inclined at an angle L3 being smaller than the angle L1. As a result, the rubber near the shoulder edges is provided with enough flexibility to reduce the shoulder wear.

Furthermore, by setting the B/A ratio, the H1/H ratio and the W1/A ratio in the above ranges, an effective prevention of uneven wear is obtained.

An embodiment of the present invention will now be explained in detail by way example only, with reference to the attached drawings, in which.

Figure 4:
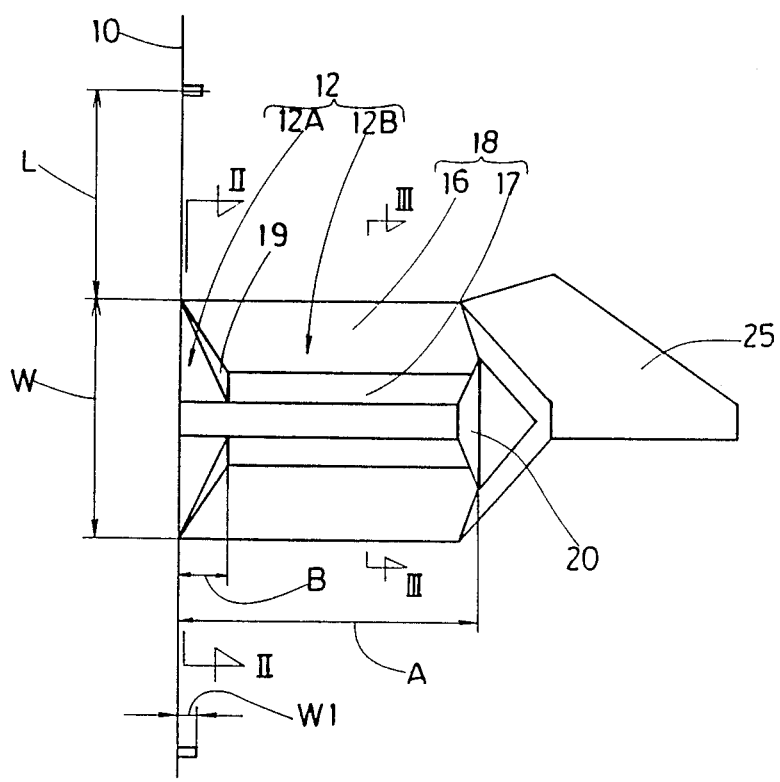
FIG. 4 is a plan view thereof.
Figure 5:
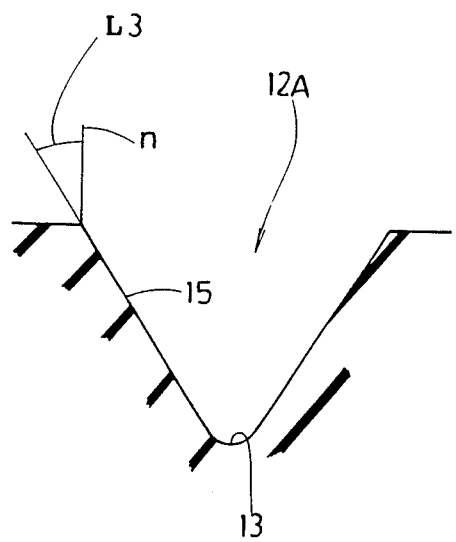
Figure 5:
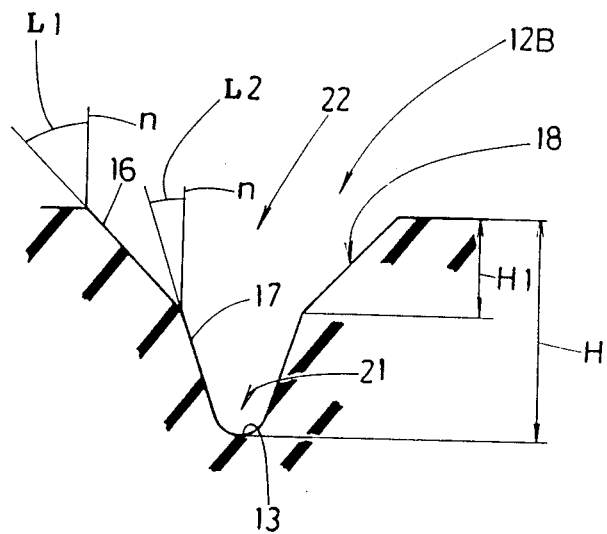
Figure 10:
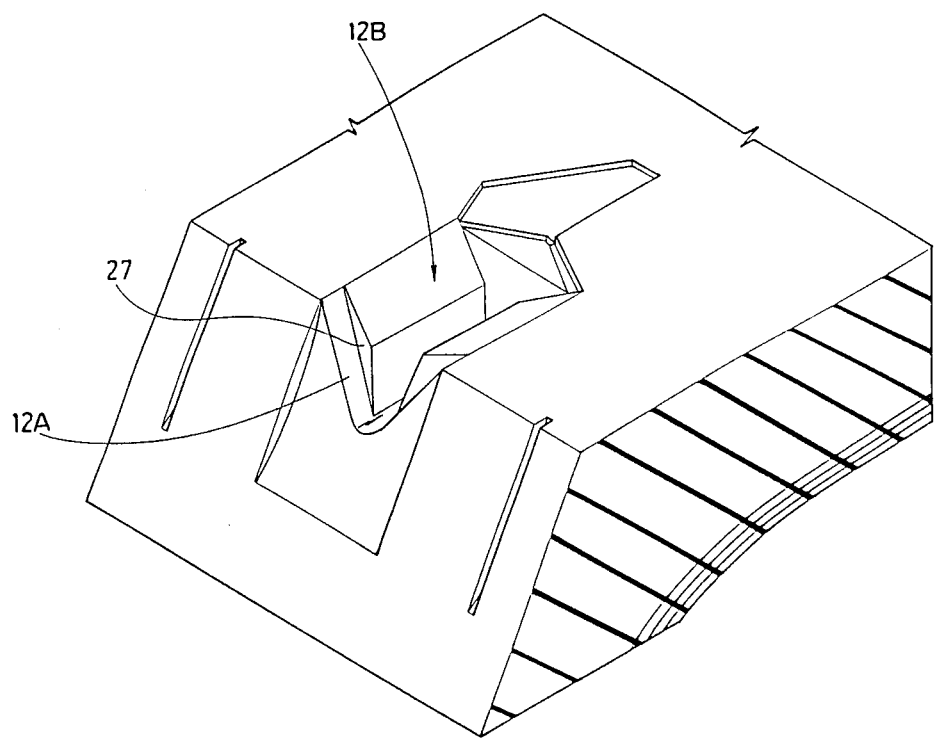
Figure 10B:
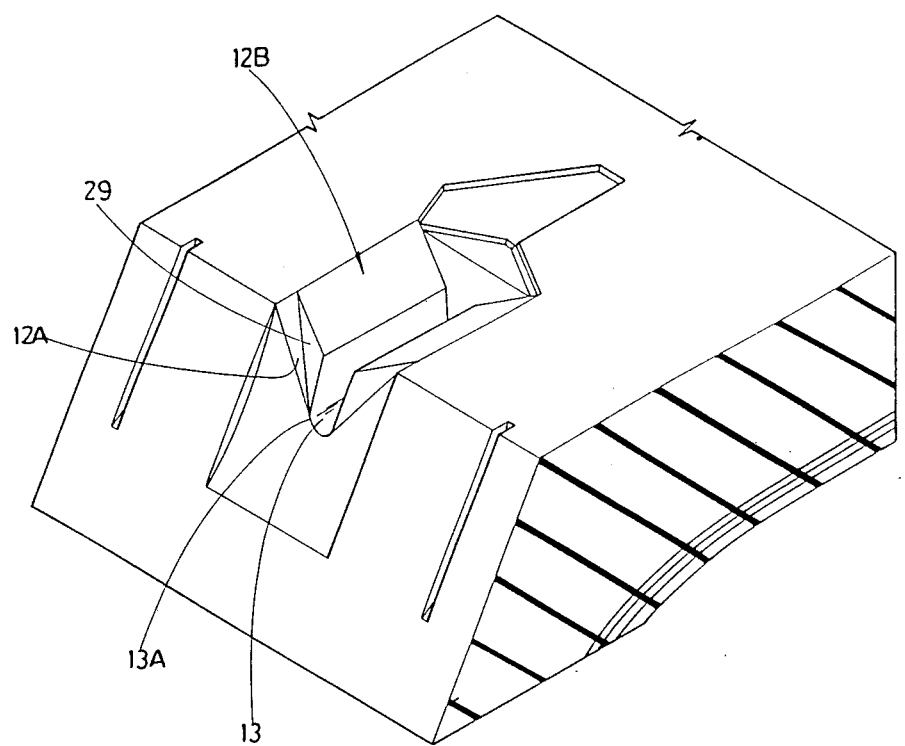
Figure 11:
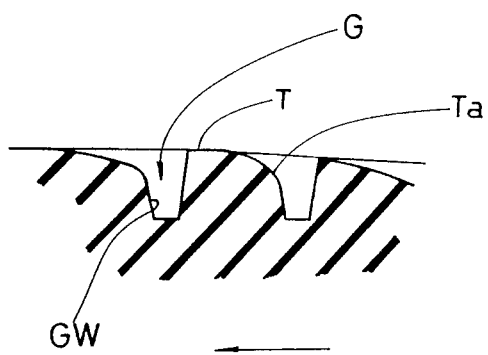

FIGS. 5(a) and 5(b) are sectional views taken along the line II—II and the line III—III of FIG. 4, respectively;

FIGS. 6 to 9 are graphs showing the relationships between the heel and toe wear and the B/A ratio, the H1/H ratio, the angle L1 and the W1/A ratio, respectively;

FIGS. 10(a) and 10(b) are perspective views each showing another embodiment of the lug groove of the present invention; and FIG. 11 is a sectional view explaining the heel and toe wear.

In FIGS. 1–5(a) and (b), the tire 1 is a radial tire for heavy duty vehicles such as bus and truck, and it comprises a carcass 5 extending between beads through sidewall portions 3 and a tread portion 2 and turned up around bead cores to be secured thereto, a rigid belt 6 composed of at least one ply, in this example two ply of steel cords disposed radially outside the carcass crown, and a rubber tread disposed radially outside the belt.

The tread is provided with circumferentially extending longitudinal grooves and axially extending lug grooves to form a rib-lug pattern.

Figure 1:
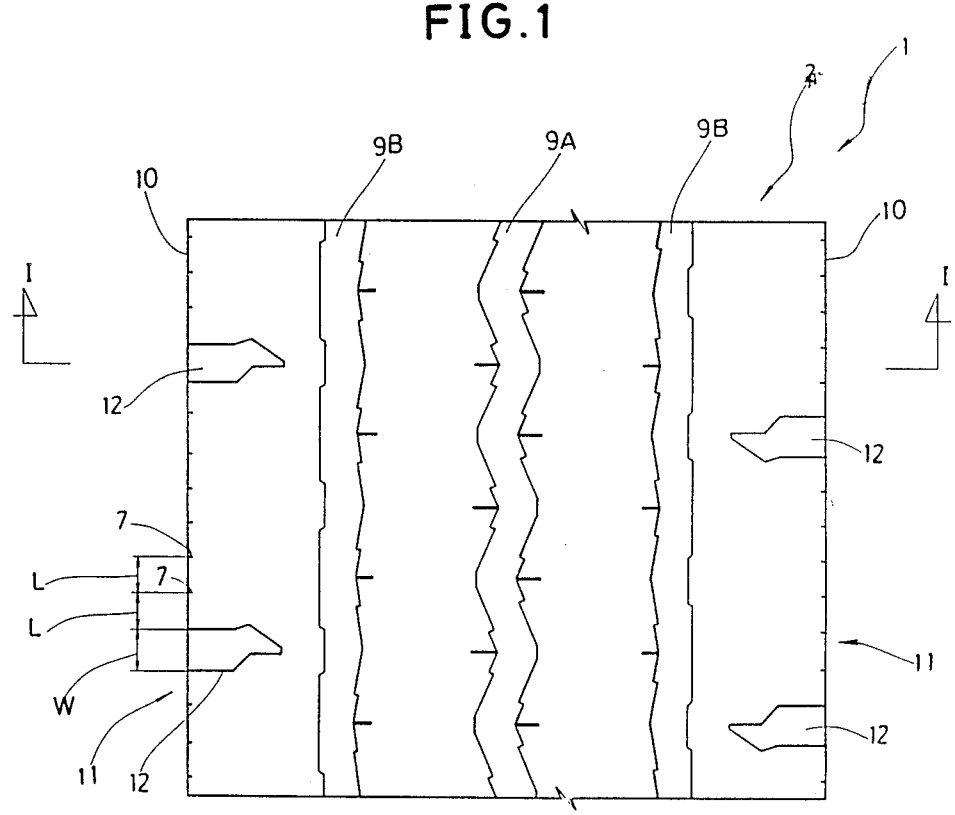
FIG. 1 is a partial plan view showing the tread of an embodiment of the present invention, but the interior of the grooves are omitted.
Figure 2:
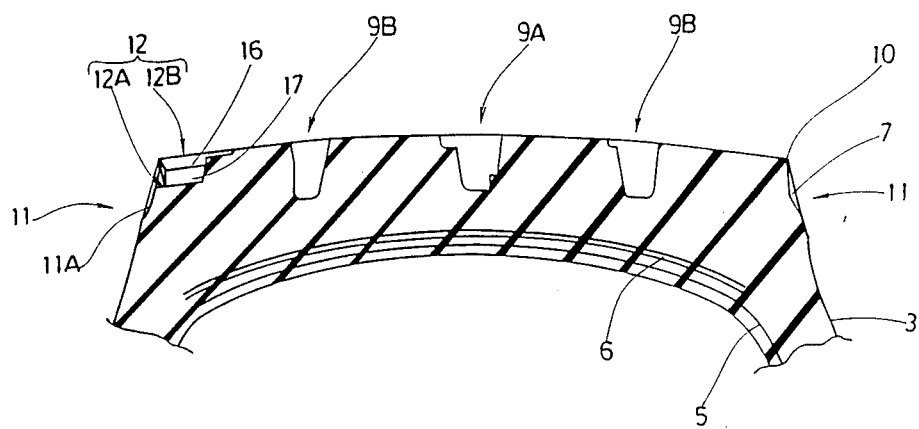
FIG. 2 is a sectional view taken along the line I—I of FIG. 1.

In this embodiment, as shown in FIG. 1, the longitudinal grooves include a groove 9A extending zigzag along the tire equator and two grooves 9B extending substantially straight disposed one on each side of the tire equator.

The lug grooves 12 are formed in the shoulder edges 10, that is, the lug grooves 12 are disposed axially outside the longitudinal grooves 9B and extending to the tread edge so as to open at the side face of the tread (hereinafter called as "buttress region" 11). The lug grooves 12 are arranged at intervals corresponding to integral times the zigzag pitch of the longitudinal groove 9A, and in this embodiment, the lug grooves are formed every two zigzag pitches.

Figure 3:
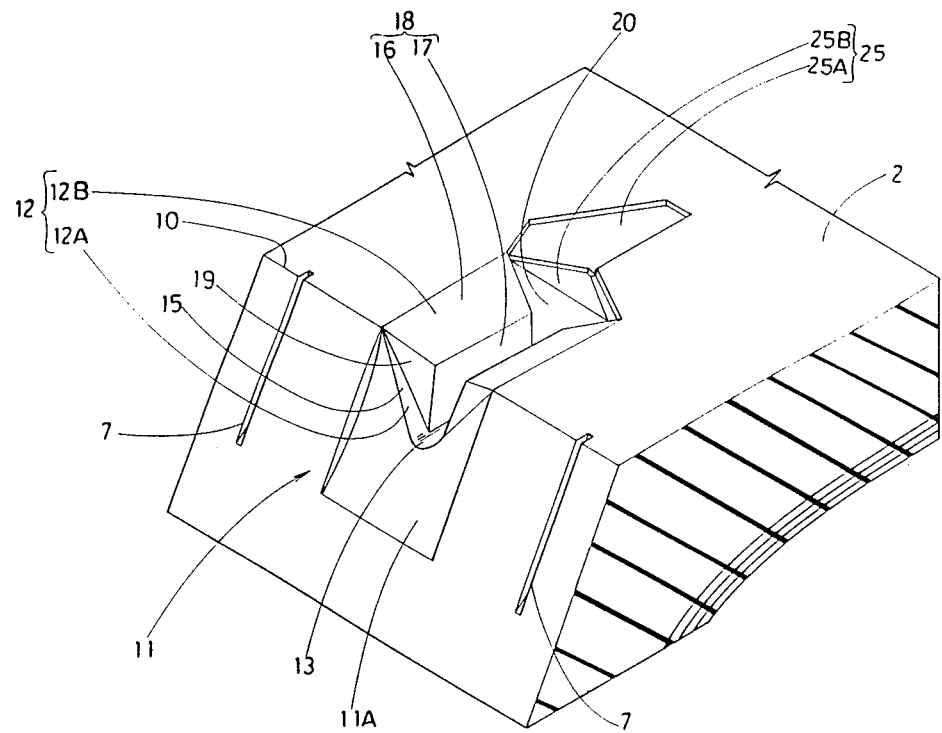
FIG. 3 is a perspective view showing the lug groove thereof.

Further, as shown in FIG. 3, the lug groove 12 is composed of two parts: an outer part 12A of which outer end is opened at a buttress hollow part 11A in the buttress region 11, and an inner part 12B of which outer end is connected to the inner end of the outer part 12A.

The inner part and the outer part are the same width at the tread face.

The outer part 12A has a pair of side walls 15 with a single inclination extending from the groove bottom to the groove top, and both the side walls are inclined at the same angle L3 to a normal line n, and accordingly this part has a V-shaped sectional shape as shown in FIG. 5(a).

The inner part 12B has a pair of bent side walls 18 with a double inclination as shown in FIG. 5(b).

The side wall 18 is composed of an upper wall 16 extending from the groove top to a portion at a depth H1, and an lower wall 17 extending from the innermost edge of the upper wall at the depth H1 to the groove bottom.

The upper wall 16 is inclined at an angle L1 to a normal line n and the lower wall 17 is inclined at an angle L2 to a normal line n smaller than the angle L1.

The angle L1 is larger than the angle L3 and the angle L2 is smaller than the angle L3.

The groove base 13 of the lug groove is formed in a cylindrical shape, and the edges thereof are connected to the side walls 15 and side walls 17 in the respective parts.

Furthermore, to connect the side wall 15 of the outer part 12A with the side wall 18, that is, the upper and lower walls 16 and 17 of the inner part 12B, in this embodiment, an oblique wall 19 is disposed therebetween. This wall 19 is tilted upward and axially outward to prevent damage of rubber chipping.

The inner part 12B is terminated by an end wall 20, but the inner end of the inner part 12B is connected to a shallow groove 25 extending toward the center of the tread, thereby improving drainage into the lug groove. The groove 25 is composed of two parts of a shallower inner part 25A and a deeper outer part 25B.

Furthermore, between the lug grooves 12, sipes 7 are formed in the buttress regions 11 as shown in FIG. 1, and the pitch L of the sipes is set to divide equally the distance between the lug grooves 12, in this example the pitch is about 12mm, and as shown in FIG. 3, the radially inner end of the sipe is terminated at the same depth from the tread face as that of the buttress hollow part 11A.

Accordingly, the inner part 12B of the lug groove is provided with a narrow groove width part 21 between the lower walls 17, whereby the rigidity in the groove bottom region is increased to suppress the movement of the groove side walls 18, and further, the lower walls 17 can contact with each other to prevent an excessive movement of the side walls 18. Therefore, heel and toe wear is effectively prevented through the whole length of the lug groove. Moreover, since the inner part 12B is provided with a wide groove width part 22 between the upper walls 16, the cross sectional groove volume is kept enough to maintain tire dynamic performance such as braking performance and wet grip performance.

Beside, the rigidity of the side wall 15 is lower than that of the side wall 16 because the inclination angle L3 of the side walls 15 is smaller than angle L1 of the upper side wall 16, and the sipes 7 divide equally the distance between the lug grooves 12. Accordingly, the rigidity about the shoulder edge 10 is evenly reduced in the circumferential direction of the tire. As a result, shoulder wear and edge wear can be prevented.

On the other hand, as shown in FIG. 4, the ratio B/A between the groove length B from the tread edge 10 to the inner end of the outer part 12A and the groove length A from the tread edge 10 to the inner end of the inner part 12B, that is, to the end wall 20 is more than 0.2 and less than 0.4, the ratio H1/H between the depth H1 of the upper groove wall 16 and the full depth H of the inner part 12B is more than 0.15 and less than 0.50, the inclination angle L1 is more than 35 degrees, and the ratio W1/A between the length W1 of the sipe measured from the tread edge 10 to the axial end at the tread face and the length A is less than 0.3.

FIGS. 6 to 9 show the results of field tests for heel and toe wear, and the above-mentioned limitations are based on those test results.

For the tests, various types of 10.00R 20 tires were prepared, and the tires of each type were mounted on the front wheels of 2-D type truck, then the feel and toe wear was measured after 30.000 km running under a normal load.

Figure 6:
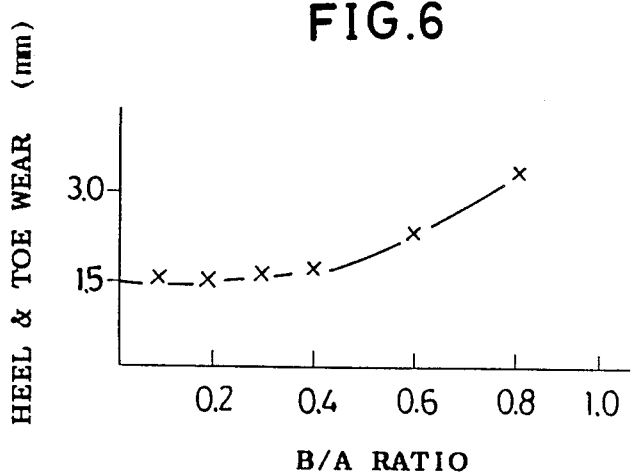

FIG. 6 shows the relationships between the heel and toe wear and the B/A ratio. In this test therefore, test tires having different B/A ratios were maid, and the other factors were made identical according to the specification given in Table 1.

Figure 7:
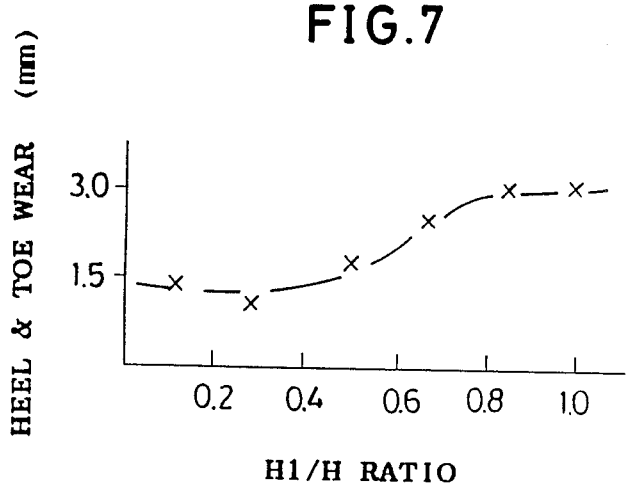
Figure 8:
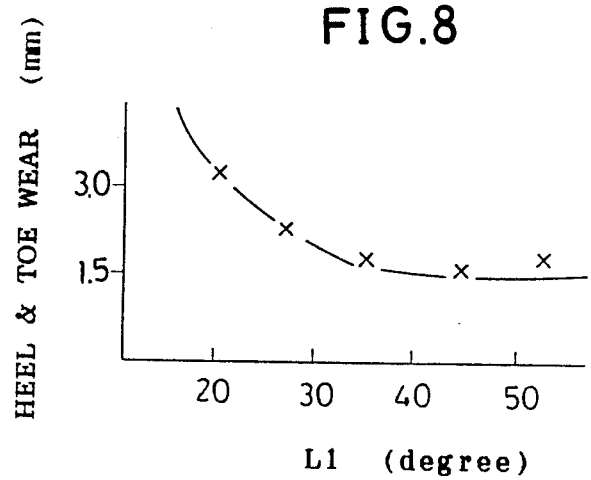
Figure 9:
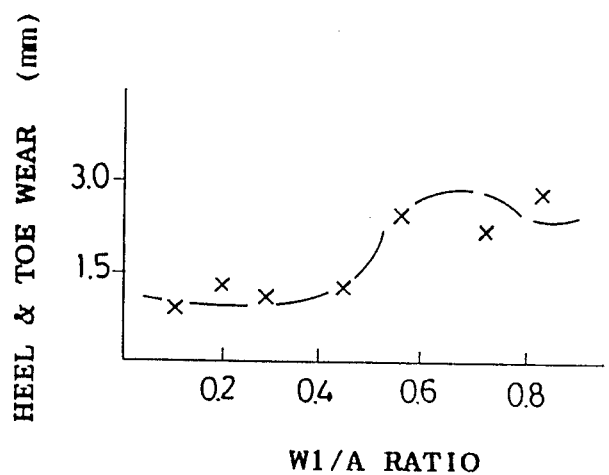

Similarly, FIGS. 7–9 show the relationships between the heel and toe wear and the H1/H ratio, the angle L1 and the W1/A ratio, respectively. In the test of FIG. 7 the H1/H ratio was varied, but the others shown in Table 2 were identical. In the test of FIG. 8 the inclination angle L1 was varied, but the others shown in Table 3 were identical. In the test of FIG. 9 the W1/A ratio was varied, but the others shown in Table 4 were identical.

As apparent from FIGS. 6–9, the heel and toe wear can be effectively prevented when the ratio B/A is less than 0.4, the ratio H1/H is less than 0.50, the inclination angle L1 is more than 35 degrees, and the ratio W1/A is less than 0.3. When the ratio B/A is less than 0.2, the length B of the outer part 12A become not sufficient to reduce the occurrence of the shoulder wear. When the ratio H1/H is less than 0.15, the cross sectional volume of the inner part 12B is excessively reduced, and as a result tire performances such as wet grip performance, drainage and the like are deteriorated. When the ratio W1/A is more than 0.3, the sipes lower the rigidity around the lug grooves 12 to increase the wear.

TABLE 1

| | |
|---|---|
| Angle L1 | 45 deg. |
| Angle L2 | 16.7 deg. |
| Angle L3 | 35.8 deg. |
| Length A | 15.25 mm |
| Length B | changed |
| Width W | 13.0 mm |
| Pitch L | 11.25 mm |
| Length W1 | 1.0 mm |
| Depth H | 4.0 mm |
| Depth H1 | 9.0 mm |

TABLE 2

| | |
|---|---|
| Angle L1 | 45 deg. |
| Angle L2 | 16.7 deg. |
| Angle L3 | 35.8 deg. |
| Length A | 15.25 mm |
| Length B | 4.0 mm |
| Width W | 13.0 mm |
| Pitch L | 11.25 mm |
| Length W1 | 1.0 mm |
| Depth H | 4.0 mm |

TABLE 2-continued

| Depth H1 | changed |
| --- | --- |

TABLE 3

| Angle L1 | changed |
| --- | --- |
| Angle L2 | 16.7 deg, |
| Angle L3 | 35.8 deg. |
| Length A | 15.25 mm |
| Length B | 4.0 mm |
| Width | 13 0 mm |
| Pitch L | 11.25 mm |
| Length W1 | 1.0 mm |
| Depth H | 4.0 mm |
| Depth H1 | 9.0 mm |

TABLE 4

| Angle L1 | 45 deg. |
| --- | --- |
| Angle L2 | 16.7 deg. |
| Angle L3 | 35.8 deg. |
| Length A | 15.25 mm |
| Length B | 4.0 mm |
| Width W | 13.0 mm |
| Pitch L | 11.25 mm |
| Length W1 | changed |
| Depth H | 4.0 mm |
| Depth H1 | 9.0 mm |

FIGS. 10(a) and (b) shown modification of the connective construction between between the outer part 12A and the inner part 12B.

In FIG. 10(a), the side wall of the outer part with a single inclination and a side wall 18 of the inner part with a double inclination are connected through a wall 27 parallel with the surface of the buttress region.

In FIG. 10(b), the side wall of the outer part with a single inclination and a side wall 18 of the inner part with a double inclination are connected through a wall 29 inclined upward so that the radially innermost tip thereof is located at the axially outer end 13A of the groove bottom 13.

As described above, in the pneumatic tire according to the present invention, the lug groove is composed of two parts of the V-shape outer part having side walls with a single inclination and the inner part having bent side walls with a double inclination. Accordingly, the resistance to uneven wear such as heel and toe wear, shoulder wear, and edge wear is greatly improved without deteriorating the tire performance, therefore the present invention is suitably applied to tires for heavy duty vehicles.

I claim:

1. A pneumatic tire having a tread provided with a rib-lug type tread pattern comprising longitudinal grooves extending circumferentially of the tire to form at least one rib in a tread crown region, lug grooves extending axially of the tire to form lugs in tread shoulder regions, and sipes formed in the tread shoulder regions extending axially inward from each tread edge, each lug groove composed of an axially outer part having side walls with a single inclination of an angle L3 and an axially inner part having side walls with a double inclination, each side wall of the axially inner part composed of an upper wall inclined at an angle L1 and a lower wall inclined at an angle L2, the angle L1 being more than 35 degrees, the angle L3 being smaller than the angle L1 and the angle L2 being smaller than the angle L3, the axial length B of the axially outer part being more than 0.2 and less than 0.4 times the total axial length A of the lug groove, the depth H1 of the upper walls of the axially inner part being more than 0.15 and less than 0.50 times the full depth H of the axially inner part, the axial length W1 of each sipe being less than 0.3 times the axial length A of the lug grooves at the tread face of the tread.

2. The pneumatic tire according to claim 1 wherein said tire is for heavy duty vehicles and the tread is provided with three longitudinal grooves comprising a center groove and two side grooves to divide the tread into four parts of substantially the same width in the axial direction of the tire.

3. The tire according to claim 2 wherein the center groove is a zigzag groove, and the two side grooves are straight grooves.

* * * * *